United States Patent
Choi et al.

(10) Patent No.: US 11,885,414 B2
(45) Date of Patent: Jan. 30, 2024

(54) PARKING APPARATUS FOR VEHICLE WITH RACK AND PINION STRUCTURE AND TRANSMISSION FOR VEHICLE INCLUDING THE SAME

(71) Applicant: NEOOTO CO., LTD., Seoul (KR)

(72) Inventors: Duk Soon Choi, Chungcheongnam-do (KR); Sun Hyun Kim, Seoul (KR)

(73) Assignee: NEOOTO CO., LTD., Seoul (KR)

( * ) Notice: Subject to any disclaimer, the term of this patent is extended or adjusted under 35 U.S.C. 154(b) by 0 days.

(21) Appl. No.: 18/070,378

(22) Filed: Nov. 28, 2022

(65) Prior Publication Data

US 2023/0167899 A1 Jun. 1, 2023

(30) Foreign Application Priority Data

Nov. 30, 2021 (KR) .................. 10-2021-0169488

(51) Int. Cl.
*F16H 63/34* (2006.01)

(52) U.S. Cl.
CPC ................ *F16H 63/3458* (2013.01)

(58) Field of Classification Search
CPC ..................... F16H 63/34; F16H 63/3458
See application file for complete search history.

(56) References Cited

U.S. PATENT DOCUMENTS

| 4,031,977 | A | * | 6/1977 | Grosseau | F16H 63/3416 180/336 |
| 5,954,179 | A | * | 9/1999 | Osborn | F16H 63/3416 192/219.5 |
| 2021/0396309 | A1 | * | 12/2021 | Wetzel | F16H 63/3466 |
| 2022/0381341 | A1 | * | 12/2022 | Ziemba | F16H 63/3466 |

FOREIGN PATENT DOCUMENTS

| DE | 202018106497 U1 | * | 12/2019 | ............ B60T 1/005 |
| JP | 2008128445 A | * | 6/2008 | ........ F16H 63/3416 |
| JP | 2009063006 A | * | 3/2009 | ........ F16H 63/3483 |
| KR | 1020100053278 | | 5/2010 | |
| WO | WO-2018108204 A1 | * | 6/2018 | ............ B60T 1/005 |

* cited by examiner

*Primary Examiner* — Lori Wu
(74) *Attorney, Agent, or Firm* — JCIPRNET

(57) ABSTRACT

A parking apparatus for a vehicle and a transmission for a vehicle are provided. The parking apparatus for the vehicle includes an actuator, a pinion gear mounted in an end portion of the actuator and rotating in a same direction as the actuator rotates, a rack gear engaged with one side of the pinion gear and linearly moving in a tangential direction to the pinion gear as the pinion gear rotates, a push assembly including a push shaft extending from an end portion of the rack gear and a push head provided on one side of the push shaft, a parking sprag rotating according to an operation of the push assembly, and a parking gear mounted in a driver and selectively engaged with the parking sprag as the parking sprag rotates.

4 Claims, 9 Drawing Sheets

PARKING APPARATUS FOR VEHICLE WITH RACK AND PINION STRUCTURE AND TRANSMISSION FOR VEHICLE INCLUDING THE SAME

CROSS-REFERENCE TO RELATED APPLICATION

This application is based on and claims priority under 35 U.S.C. § 119 to Korean Patent Application No. 10-2021-0169488, filed on Nov. 30, 2021, in the Korean Intellectual Property Office, the disclosure of which is incorporated by reference herein in its entirety.

BACKGROUND

1. Field

The present disclosure relates to a parking apparatus for a vehicle and a transmission for a vehicle including the parking apparatus, and particularly, to a parking apparatus for a vehicle having a rack-and-pinion structure for directly driving a push shaft and a transmission for a vehicle including the parking apparatus.

2. Description of the Related Art

A transmission for a vehicle is a power transfer device for generating the highest torque or the highest output according to a speed of a vehicle or revolutions per minute of an engine. In general, a transmission for a vehicle operates in a parking mode, a reverse mode, a neutral mode, or a drive mode through a shift lever or a shift-by-wire.

The known transmission performs a parking operation by engaging a parking gear with a parking sprag or disengaging the parking gear from the parking sprag while a parking rod slides and reciprocates in conjunction with an operation of a gear lever when a vehicle is parked.

However, the known transmission has many and complicated configurations, and accordingly, a cumulative tolerance due to assembly between components increases. Therefore, when an operation of the shift lever is not correct, the engagement of the parking sprag with the parking gear is reduced, and accordingly, the operation feeling of the shift lever and the parking performance are reduced.

In particular, according to the known transmission, when the parking is released on an inclined road, a large operating force is generated due to the frictional resistance of a contact surface between the parking gear and the parking sprag, and when the engagement of the parking gear and the parking scrap is suddenly released or the parking gear and the parking scrap come into contact with each other by ignoring the frictional resistance, a large shock or vibration occurs.

The prior art is possessed by the inventor to derive the present disclosure or is technical information acquired during derivation of the present disclosure, and accordingly, the prior art cannot necessarily be called a known technology disclosed to the general public prior to the filing of the present disclosure.

SUMMARY

The present disclosure provides a rack-and-pinion structure for directly driving a push shaft for operating a parking sprag, and accordingly, a parking apparatus and a transmission may be reduced in weight and simplified.

However, the object is an example, and objects to be achieved by the present disclosure are not limited thereto.

Additional aspects will be set forth in part in the description which follows and, in part, will be apparent from the description, or may be learned by practice of the presented embodiments of the disclosure.

According to an aspect of the present disclosure, a parking apparatus for a vehicle includes an actuator, a pinion gear mounted in an end portion of the actuator and rotating in a same direction as the actuator rotates, a rack gear engaged with one side of the pinion gear and linearly moving in a tangential direction to the pinion gear as the pinion gear rotates, a push assembly including a push shaft extending from an end portion of the rack gear and a push head provided on one side of the push shaft, a parking sprag rotating according to an operation of the push assembly, and a parking gear mounted in a driver and selectively engaged with the parking sprag as the parking sprag rotates.

In the parking apparatus according to the embodiment of the present disclosure, when the rack gear moves toward the parking sprag, at least one of the push head and the push shaft may come into contact with the parking sprag to pressurize the parking sprag.

In the parking apparatus according to the embodiment of the present disclosure, the push assembly may further include a push spring between the rack gear and the push head.

In the parking apparatus according to the embodiment of the present disclosure, the push head may be mounted in an outer circumferential surface of the push shaft such that one end of the push shaft is exposed and have a truncated cone shape in which an outer surface of the push head is inclined toward one end of the push shaft.

According to another aspect of the present disclosure, a transmission for a vehicle includes a plurality of drivers, a parking apparatus for a vehicle connected to at least one of the plurality of drivers, and a housing in which the plurality of drivers and the parking apparatus for the vehicle are mounted, wherein the parking apparatus for the vehicle includes an actuator, a pinion gear mounted in an end portion of the actuator and rotating in a same direction as the actuator rotates, a rack gear engaged with one side of the pinion gear and linearly moving in a tangential direction to the pinion gear as the pinion gear rotates, a push assembly including a push shaft extending from an end portion of the rack gear and a push head provided on one side of the push shaft, a parking sprag rotating according to an operation of the push assembly, and a parking gear mounted in a drive shaft and selectively engaged with the parking sprag as the parking sprag rotates.

Other aspects, features, and advantages other than those described above will become apparent from the following detailed descriptions, claims and drawings for implementing the present disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
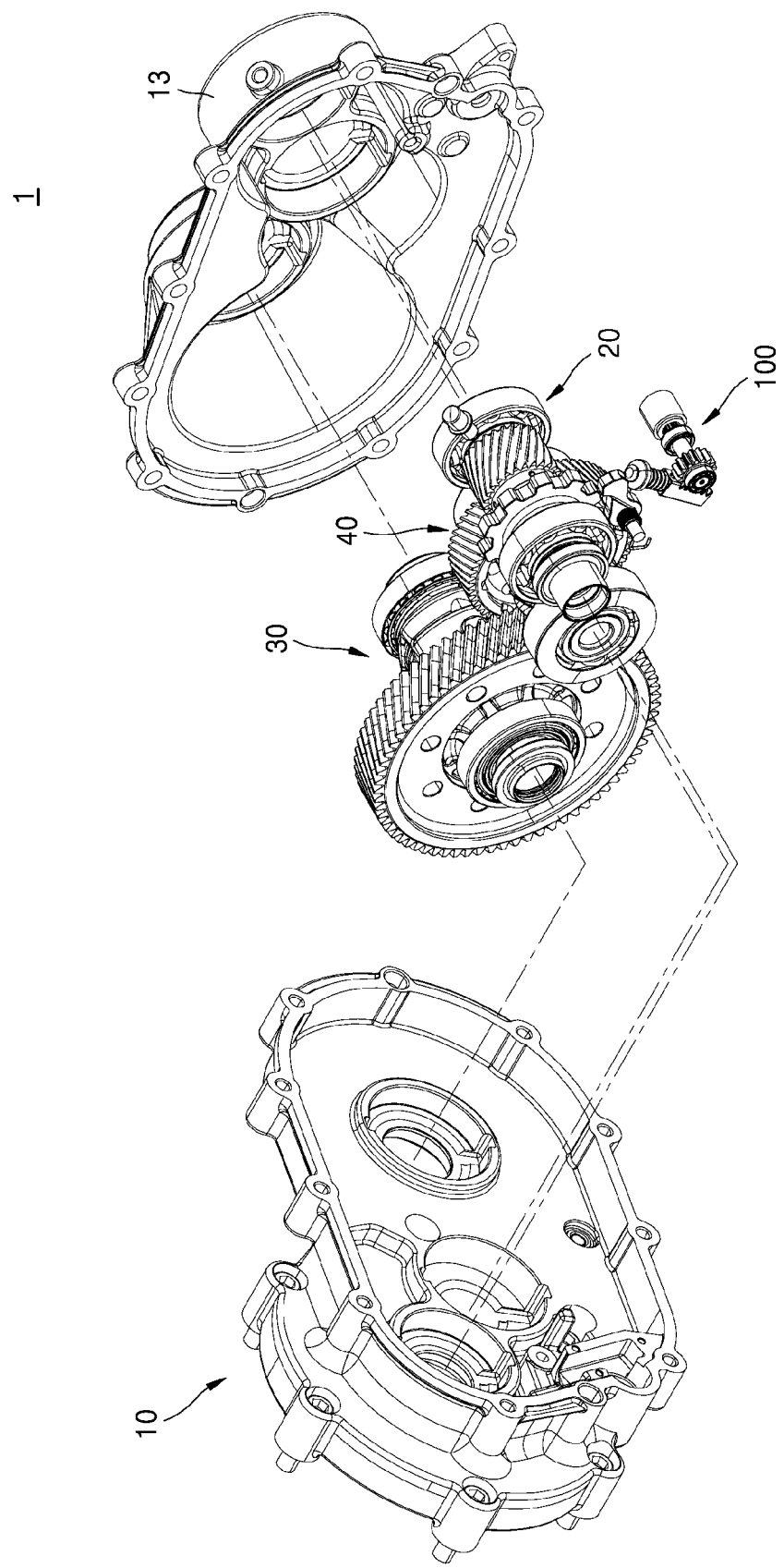
FIG. 1 illustrates a transmission for a vehicle according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present disclosure may be variously modified and may have various embodiments, and thus, various embodiments may be illustrated in the drawings and described in detail in the descriptions of the present disclosure. However, this does not limit the present disclosure to the various embodiments, and it should be understood to include all modifications, equivalents, and substitutes included in the idea and scope of the present disclosure. In describing the present disclosure, even though the same components are illustrated in other embodiments, the same identification numbers are used for the same components.

Hereinafter, embodiments of the present disclosure will be described in detail with reference to the accompanying drawings, and when described with reference to the drawings, the same or corresponding components are given the same reference numerals, and redundant descriptions thereof are omitted.

In the following embodiments, terms such as first and second are used for the purpose of distinguishing one component from another component, not in a limiting sense.

In the following embodiments, the singular expression includes the plural expression unless the context clearly dictates otherwise.

In the following embodiments, terms such as include or have means that features or components described in the specification exist, and a possibility that one or more other features or components will be added is not excluded in advance.

In the drawings, sizes of the components may be exaggerated or reduced for the sake of convenience of description. For example, sizes and thicknesses of the components illustrated in the drawings are randomly indicated for the sake of convenience of description, and thus, the present disclosure is not limited to the illustration.

In the following embodiments, an x axis, a y axis, and a z axis are not limited to three axes on the Cartesian coordinate system and may be interpreted in a broad sense including the axes. For example, the x axis, the y axis, and the z axis may be orthogonal to each other, but may refer to different directions that are not orthogonal to each other.

When certain embodiments are otherwise practicable, a certain process sequence may be performed differently from the described sequence. For example, two processes described in succession may be performed simultaneously or may be performed in an order opposite to the order previously described.

Terms used in the present disclosure are only used to describe some embodiments and are not intended to limit the present disclosure. In the present disclosure, it should be understood that terms, such as "comprise", "include", or "have", designate that features, numbers, steps, operations, components, configuration elements, or combinations thereof described in the present disclosure exists, and the presence or the possibility of addition of one or more other features, numbers, steps, operations, components, configuration elements, or combinations thereof are not precluded in advance.

Figure 2:
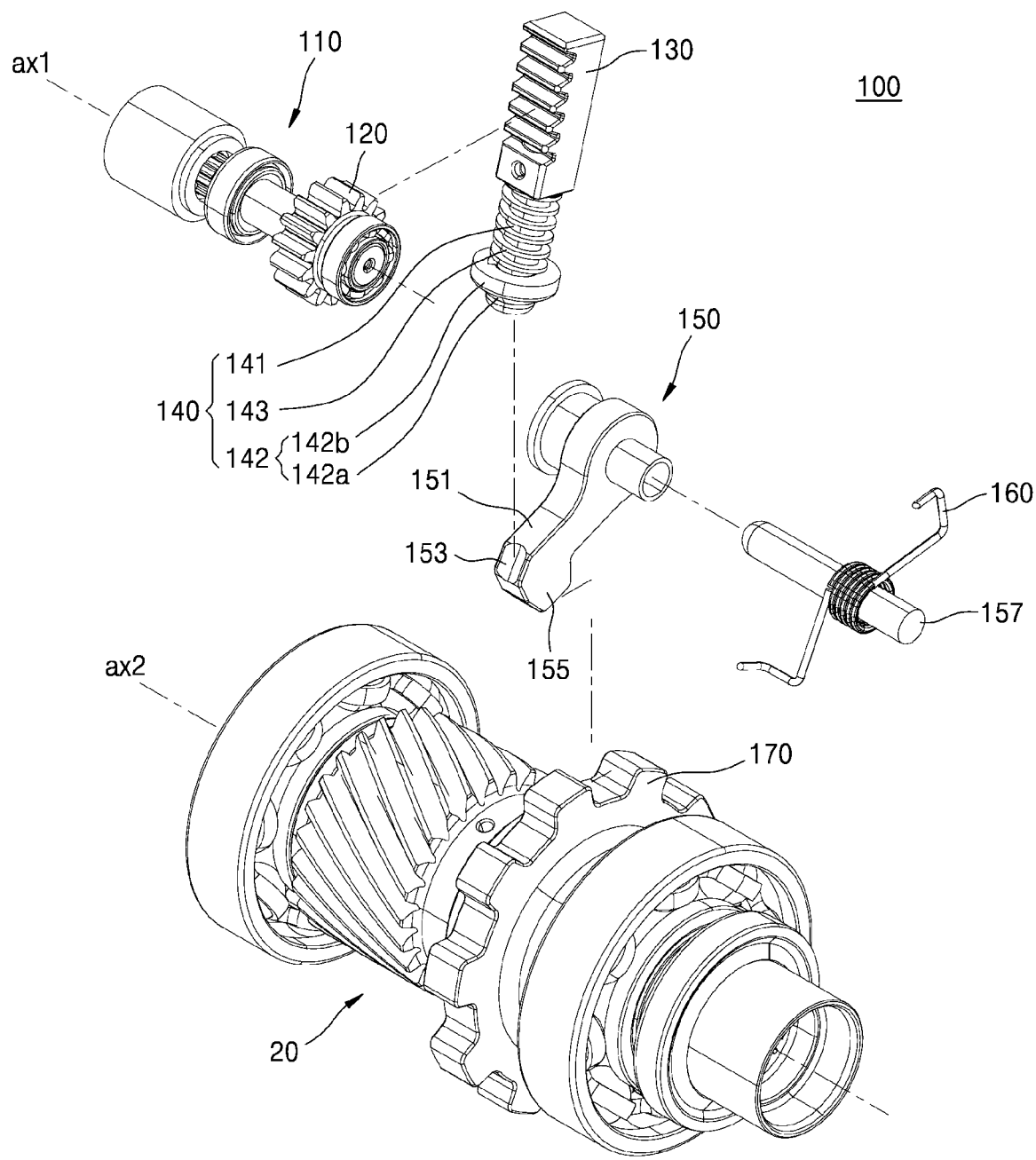
FIGS. 2 and 3 illustrate a parking apparatus for a vehicle according to an embodiment of the present disclosure.
Figure 3:
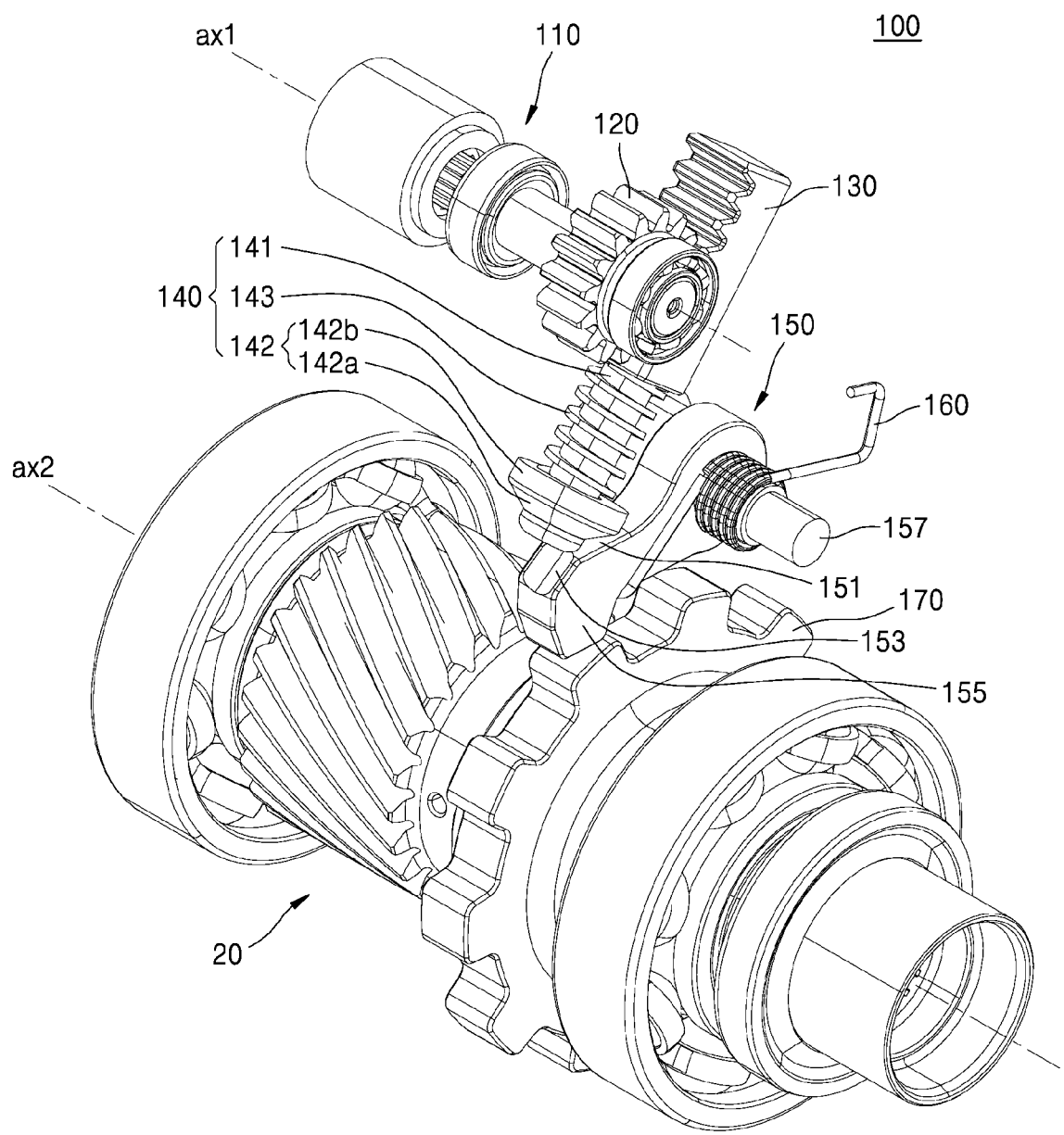
Figure 4A:
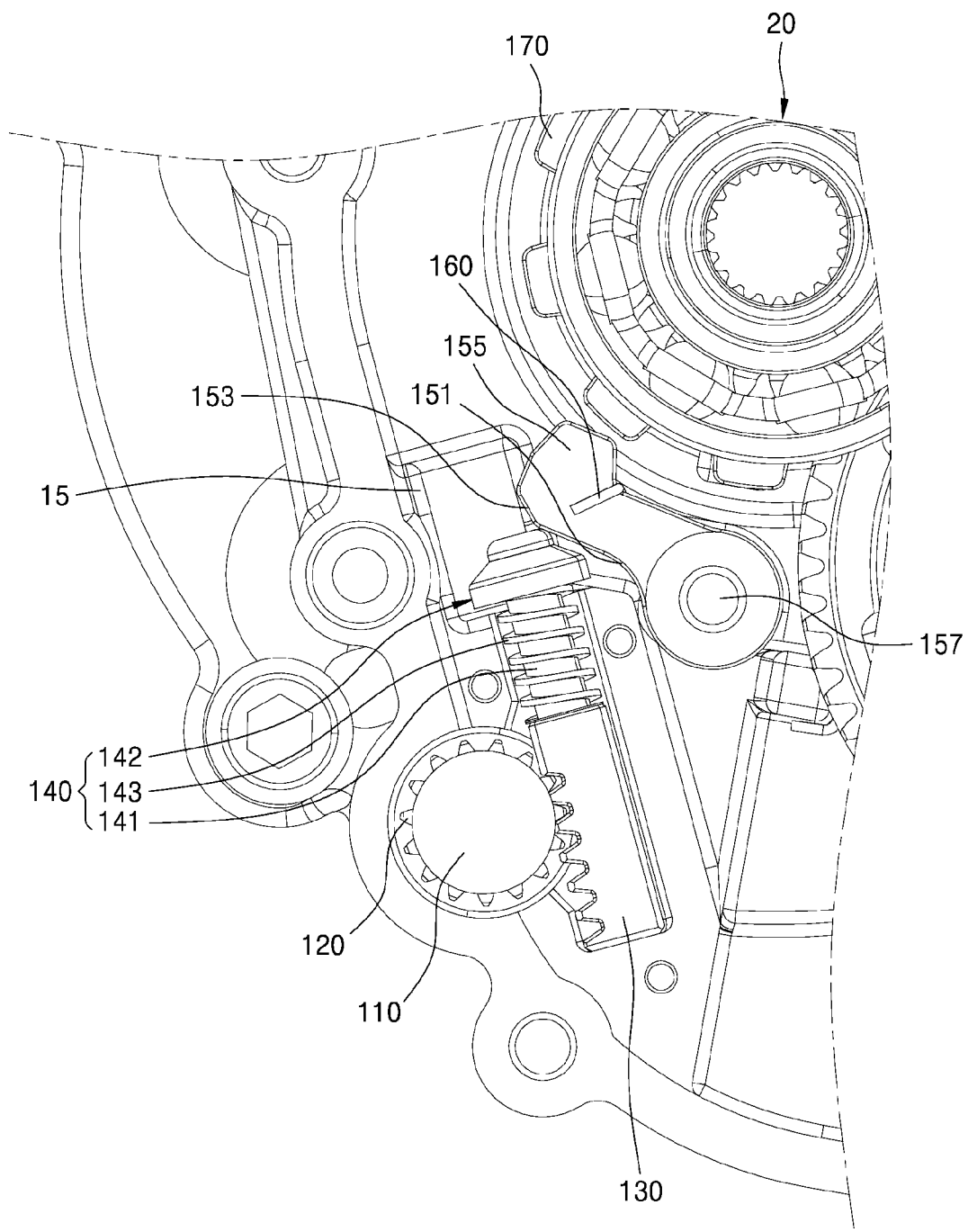
FIGS. 4A to 4C illustrate a parking operation of a parking apparatus for a vehicle, according to an embodiment of the present disclosure.
Figure 4B:
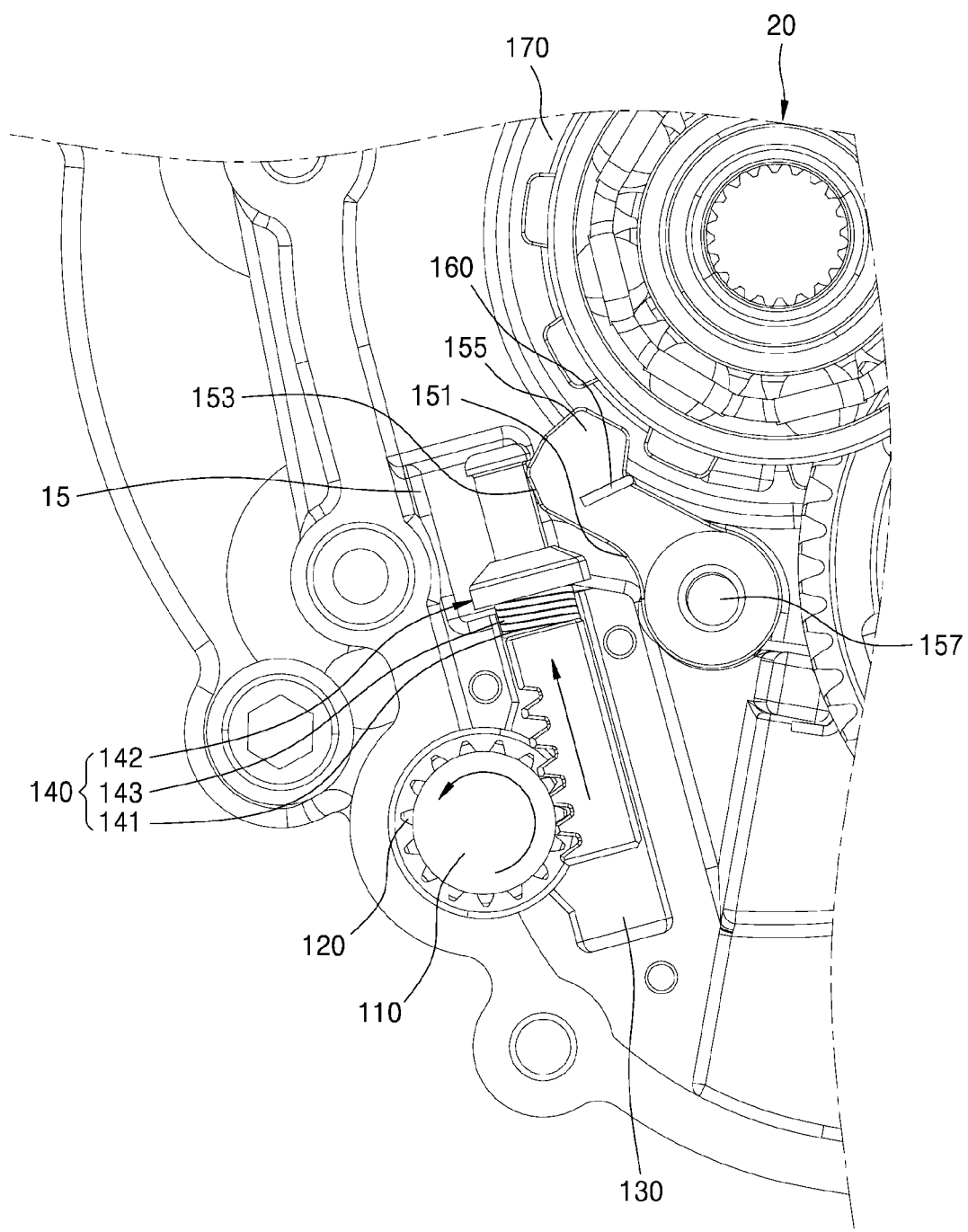
Figure 4C:
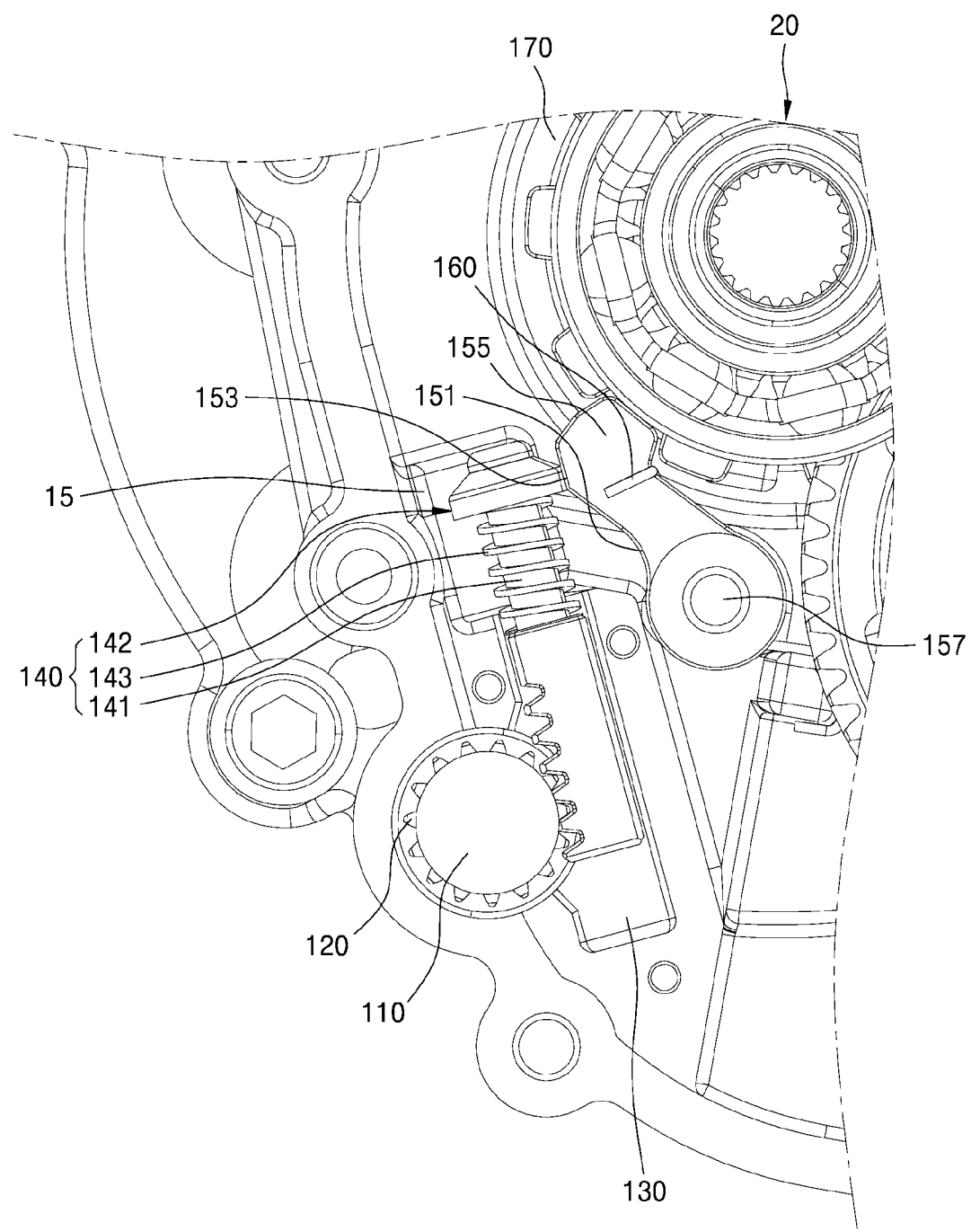
Figure 5A:
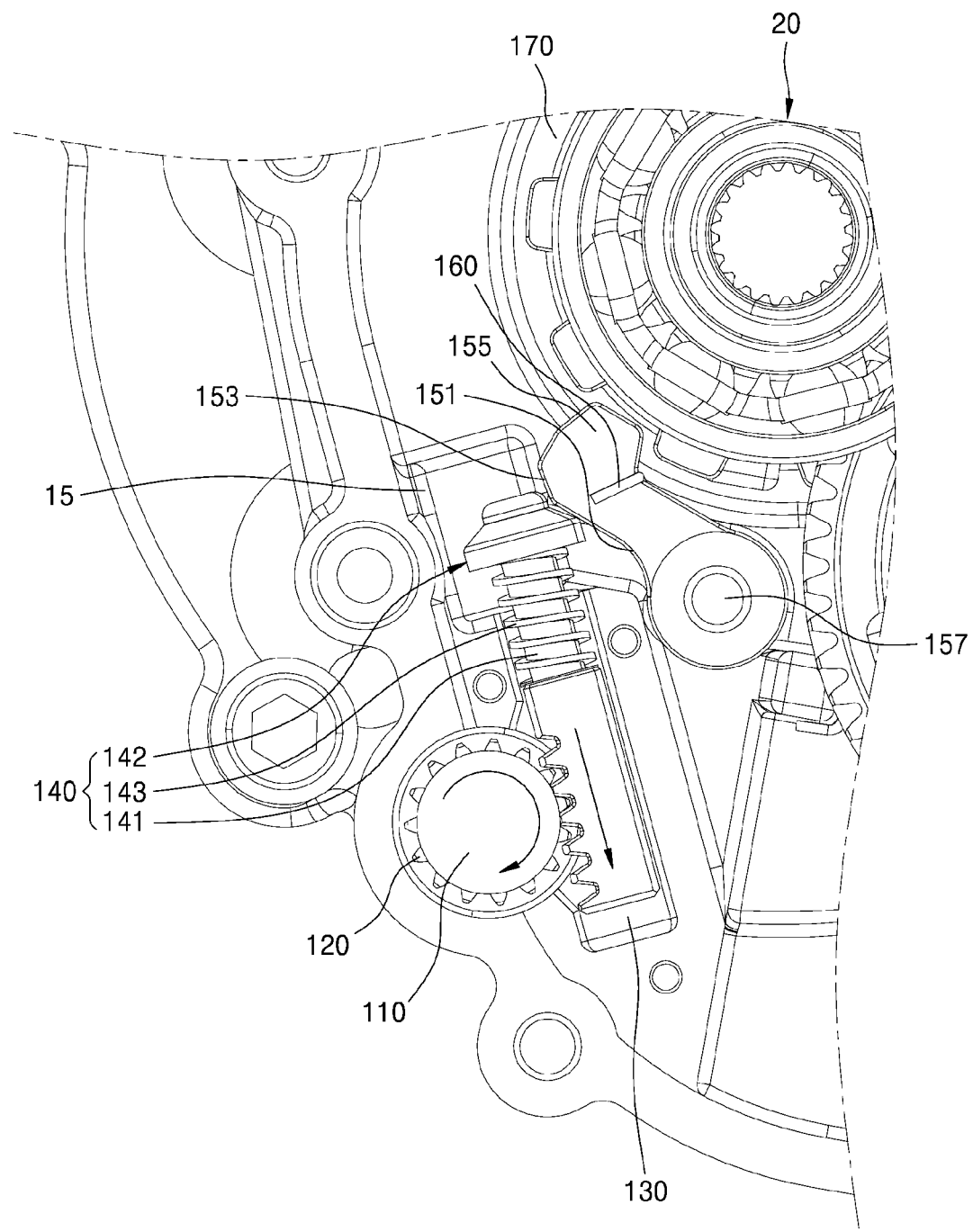
FIGS. 5A to 5C illustrate a parking release operation of a parking apparatus for a vehicle, according to an embodiment of the present disclosure.
Figure 5B:
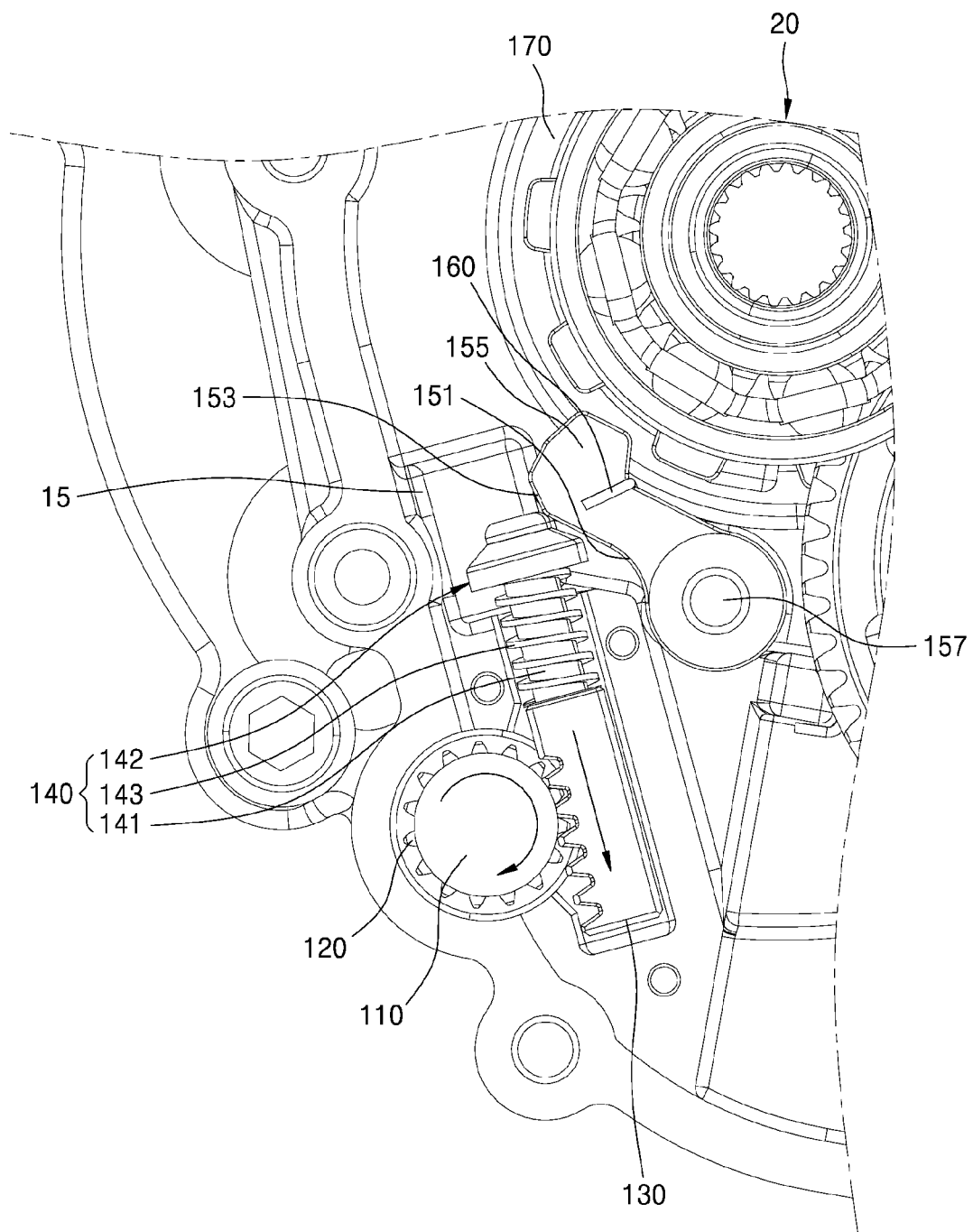
Figure 5C:
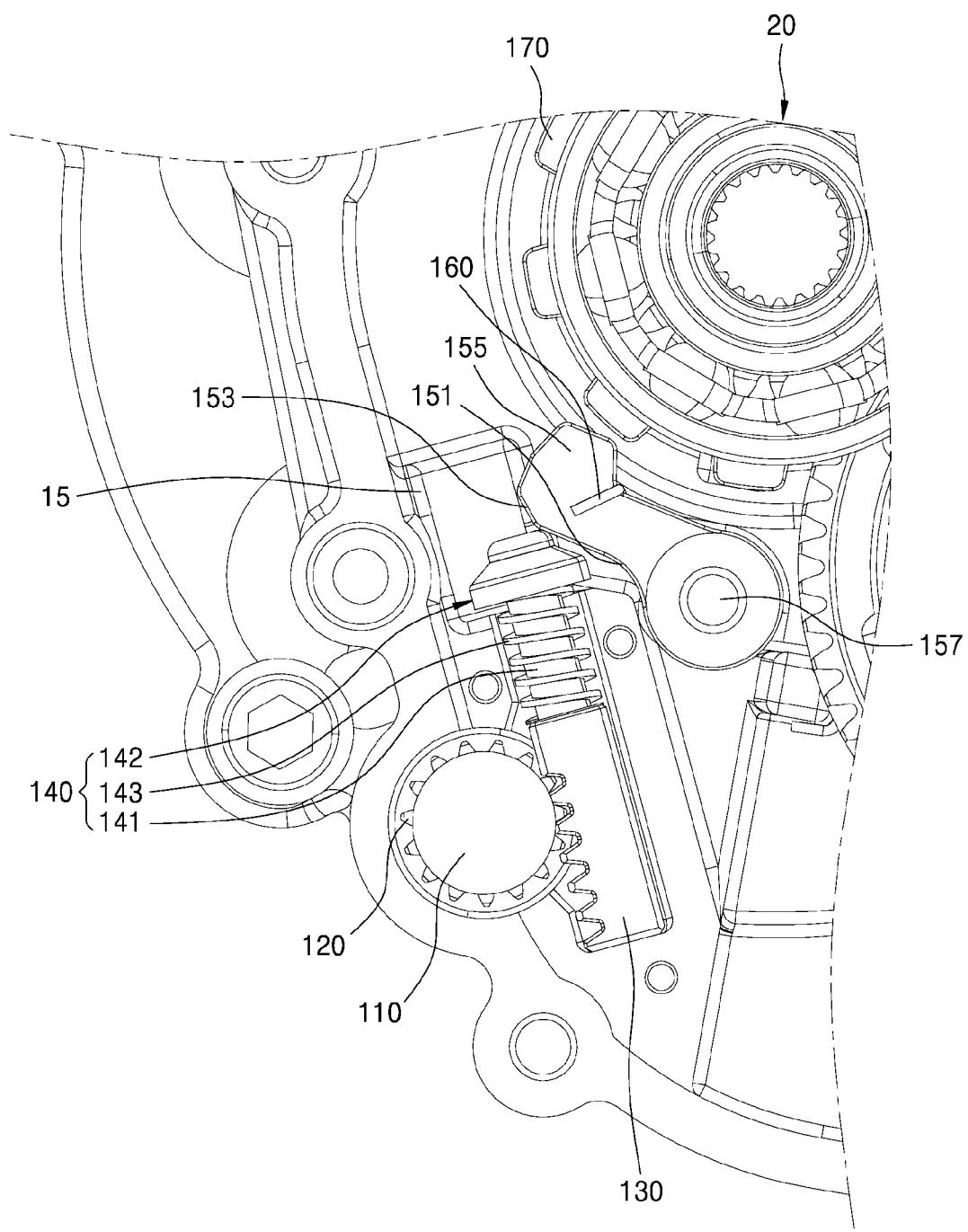

FIG. 1 illustrates a transmission 1 for a vehicle according to an embodiment of the present disclosure, FIGS. 2 and 3 illustrate a parking apparatus 100 for a vehicle according to an embodiment of the present disclosure, FIGS. 4A to 4C illustrate the parking operation of a parking apparatus 100 for a vehicle, according to an embodiment of the present disclosure, and FIGS. 5A to 5C illustrate a parking release operation of the parking apparatus 100 for a vehicle, according to an embodiment of the present disclosure.

As illustrated in FIG. 1, the transmission 1 for a vehicle includes a housing 10, a plurality of drivers, and the parking apparatus 100 for a vehicle.

The housing 10 includes a space in which the plurality of drivers and the parking apparatus 100 for a vehicle are mounted. The housing 10 may include a front housing 11 and a rear housing 13 coupled to each other, and the plurality of drivers and the parking apparatus 100 for a vehicle mounted therein.

In one embodiment, the housing 10 may be provided such that the plurality of drivers are rotatable about a drive shaft. In addition, an actuator 110 for driving the parking apparatus 100 for a vehicle may be mounted on one side of the housing 10.

The plurality of drivers may include a first driver 20, a second driver 30, and a third driver 40.

The first driver 20 may receive a drive force from the outside, and one end thereof may be inserted into an opening of the housing 10 such that at least a part thereof may protrude to the outside. In one embodiment, the first driver 20 may be an input shaft of the transmission 1 for a vehicle. The first driver 20 may rotate about a rotation axis ax2.

The second driver 30 may be spaced apart from the first driver 20 and may be selectively driven and connected to the first driver 20. In one embodiment, the second driver 30 may be an output shaft of the transmission 1 for a vehicle.

The third driver 40 may be between the first driver 20 and the second driver 30. Bearings fixed to the housing 10 may be at both ends of the third driver 40.

The number of drivers is not limited to three and may be two or less or four or more. Hereinafter, for the sake of convenience of description, a case in which the driver includes the first driver 20, the second driver 30, and the third driver 40 will be mainly described.

The parking apparatus 100 for a vehicle may be connected to any one of the plurality of drivers, for example, the first driver 20, the second driver 30, and the third driver 40. The parking apparatus 100 for a vehicle is arranged to be connected to any one of the plurality of drivers, and a parking sprag 150 may engage with a parking gear 170 according to an operation of the actuator 110 to put the transmission 1 for a vehicle in a parking mode. Hereinafter, for the sake of convenience of description, a case in which the parking apparatus 100 for a vehicle is connected to the first driver 20 will be mainly described.

As illustrated in FIGS. 2 and 3, the parking apparatus 100 for a vehicle may include the actuator 110, a pinion gear 120, a rack gear 130, a push assembly 140, the parking sprag 150, a return spring 160, and the parking gear 170.

The actuator 110 rotates by receiving an electric power from the outside. For example, as illustrated in FIGS. 2 and 3, the actuator 110 may include a portion that receives an external power, and a shaft extending therefrom. When power is supplied, the shaft rotates about a rotation axis ax1, and a pinion gear 120 may be mounted at an end portion thereof. In addition, the actuator 110 may include one or more bearings to smoothly rotate while the actuator 110 is mounted in the housing 10.

The pinion gear 120 may be mounted on an end portion of the actuator 110 and rotates in the same direction according to the rotation of the actuator 110. For example, the pinion gear 120 may be mounted on an outer circumferential surface of the shaft of the actuator 110. In addition, the pinion gear 120 may have a ring shape in which a gear is formed on an outer circumferential surface thereof.

The rack gear 130 may engage with one side of the pinion gear 120. The rack gear 130 may linearly move in a tangential direction together with the pinion gear 120 as the pinion gear 120 rotates. In one embodiment, the rack gear 130 may have a rectangular parallelepiped shape in which a gear to be engaged with the pinion gear 120 is formed on one surface thereof.

When the actuator 110 rotates, the pinion gear 120 rotates, the rack gear 130 linearly moves, the push assembly 140 moves the parking sprag 150, and thus, a parking operation is performed.

In one embodiment, the push assembly 140 may include a push shaft 141, a push head 142, and a push spring 143.

The push shaft 141 extends in one direction from an end portion of the rack gear 130. For example, the push shaft 141 may extend in a direction perpendicular to the pinion gear 120 from one end portion of the rack gear 130.

In one embodiment, as the rack gear 130 linearly moves, the push shaft 141 also linearly moves in the same direction, and thereby, the parking sprag 150 may rotate. In addition, according to the parking operation, the push shaft 141 may come into contact with the parking sprag 150 or may be spaced apart therefrom.

The push head 142 may be on one side of the push shaft 141. For example, the push head 142 may be mounted on an outer circumferential surface of the push shaft 141 such that one end of the push shaft 141 is exposed. In addition, the push head 142 may be movable while being inserted into the push shaft 141.

In one embodiment, as the rack gear 130 linearly moves, the push head 142 also linearly moves in the same direction, and thereby, the parking sprag 150 may operate. In addition, according to the parking operation, the push head 142 may come into contact with the parking sprag 150 or may be spaced apart therefrom. For example, the push head 142 may come into contact with the parking sprag 150 at the same time as the push shaft 141 or at a different point in time.

In addition, a first outer surface 142a of the push head 142 may have a truncated cone shape that is inclined toward one end of the push shaft 141. That is, the push head 142 may have a shape in which a cross-sectional area thereof is reduced in a direction away from the rack gear 130.

With the configuration described above, the push head 142 may maintain an area, which comes into contact with the parking sprag 150, constant. More specifically, as the rack gear 130 moves toward the parking sprag 150, the push shaft 141 and the push head 142 also linearly move in the same direction. In addition, when the push shaft 141 and/or the push head 142 comes into contact with the parking sprag 150, the parking sprag 150 rotates about a rotation axis. While the push shaft 141 and/or the push head 142 moves linearly, the parking sprag 150 rotates, and thus, contact areas of the push shaft 141 and/or the push head 142 and the parking sprag 150 may not be constant as the parking operation is continuously performed.

When the push head 142 has a flat polyhedral or cylindrical shape, a contact area of the push head 142 and the parking sprag 150 may not be maintained constant. In addition, the first outer surface 142a has a truncated cone shape, the parking sprag 150 also has an inclined surface corresponding thereto as described below, and thus, of the push head 142 according to an embodiment of the present disclosure may maintain a constant contact area between the push head 142 and the parking sprag 150 regardless of a parking operation. As described above, the parking apparatus 100 for a vehicle according to an embodiment of the present disclosure may transfer a constant force during a parking process, thereby performing an accurate parking operation.

In addition, the push head 142 may have a second outer surface 142b of a cylindrical shape extending in one direction from the first outer surface 142a of a truncated cone shape. Accordingly, when the push head 142 presses the parking sprag 150 to perform a parking operation, the first outer surface 142a comes into contact with the parking sprag 150, and when the parking operation is completed, the second outer surface 142b may press the parking sprag 150 to maintain a parking state.

The push spring 143 is wound around an outer circumferential surface of the push shaft 141 and may be between the rack gear 130 and the push head 142. In addition, the push spring 143 may have one end connected to the push head 142 and the other end connected to the rack gear 130.

The push spring 143 extends or compresses according to an operation of the push assembly 140 to provide a restoring force. For example, when the push shaft 141 moves toward the parking gear 170 to cause the push head 142 to come into contact with the parking sprag 150, the push shaft 141 comes into contact with the parking sprag 150 and continuously perform a linear movement. In addition, the push head 142 is prevented from moving by the parking sprag 150, and accordingly the push spring 143 is compressed. Thereafter, when the push shaft 141 moves further to cause the parking sprag 150 to engage with the parking gear 170, the push head 142 moves to one end portion of the push shaft 141 by a restoring force of the push spring 143.

The parking sprag 150 rotates according to an operation of the push assembly 140 and selectively engages with the parking gear 170. For example, when the push shaft 141 and the push head 142 move toward the parking gear 170 to perform a parking operation, the parking sprag 150 rotates to engage with the parking gear 170, and thus, parking is completed. Thereafter, when the push shaft 141 and the push head 142 move in a direction away from the parking gear 170 to release the parking, the parking sprag 150 rotates in an opposite direction to be released from engagement with the parking gear 170, and thus, the parking is released.

In one embodiment, the parking sprag 150 may include an inclination portion 151, a concave portion 153, a parking portion 155, and the rotation shaft 157.

As illustrated in FIGS. 2 and 3, the parking sprag 150 may have a shape extending to one side about the rotation shaft 157. The rotation shaft 157 may be rotatably supported by one side of the housing 10.

The inclination portion 151 extends toward an end portion of in the parking sprag 150 inserted into the rotation shaft 157 and may have a shape inclined toward the push head 142. For example, as illustrated in FIG. 2, the push head 142 has a truncated cone shape in which a cross-sectional area thereof is reduced toward an end portion of the push shaft 141, and the inclination portion 151 may be inclined to correspond to an outer surface of the push head 142. Accordingly, even if the push head 142 linearly moves, it is possible to maintain a constant contact area with the inclination portion 151.

The concave portion 153 extends from the inclination portion 151 and may have a shape concavely recessed toward the inside. In one embodiment, the concave portion 153 may have a shape corresponding to the push shaft 141. That is, a curvature of the concave portion 153 may correspond to a curvature of an outer surface of the push shaft 141. Accordingly, the push shaft 141 may move smoothly and linearly along the concave portion 153 while pressing the parking sprag 150.

The parking portion 155 may protrude to directly engage with the parking gear 170. As the push shaft 141 and the push head 142 press the inclination portion 151 and the concave portion 153, the parking sprag 150 rotates about the rotation shaft 157. In addition, the parking portion 155 may have a shape corresponding to a gear shape of the parking gear 170, that is, a shape corresponding to a portion between two adjacent gear teeth. Accordingly, the parking portion 155 may engage with the parking gear 170 to perform a parking operation.

The return spring 160 may be wound around the rotation shaft 157 of the parking sprag 150, and one end thereof may surround at least a part of the parking sprag 150. More specifically, one end of the return spring 160 may be in contact with a surface of the parking sprag 150 facing the parking gear 170. Accordingly, when the parking sprag 150 rotates toward the parking gear 170, the return spring 160 may apply a restoring force in an opposite direction. Accordingly, a parking release operation may be performed quickly and accurately.

The parking gear 170 may be mounted in any one of the plurality of drivers and may selectively engage with the parking sprag 150 according to the rotation of the parking sprag 150. For example, as illustrated in FIGS. 2 and 3, the parking gear 170 may be mounted in the first driver 20. The parking gear 170 may rotate integrally with the first driver 20. Accordingly, when the parking sprag 150 engages with the parking gear 170, the first driver 20 may stop and a parking operation may be performed.

Next, a parking operation of the parking apparatus 100 for a vehicle according to an embodiment of the present disclosure will be described with reference to FIGS. 4A to 4C.

As illustrated in FIG. 4A, when a vehicle is running, that is, in a state in which the parking operation is not performed, the parking sprag 150 does not engage with the parking gear 170. In addition, the push head 142 is arranged to expose a part of a front end portion of the push shaft 141, and the push spring 143 may be in a compressed or non-extended state.

Next, as illustrated in FIG. 4B, when the actuator 110 and the pinion gear 120 rotate to perform a parking operation, the rack gear 130 linearly moves toward the parking gear 170. Accordingly, while the push shaft 141 and the push head 142 are in contact with the parking sprag 150, the push shaft 141 and the push head 142 rotate the parking sprag 150 toward the parking gear 170. In this case, when the parking sprag 150 is in a position where the parking sprag 150 does not engage with the parking gear 170 depending on operation states of the transmission 1 for a vehicle, the push spring 143 is compressed between the push head 142 and the rack gear 130 while being pushed backward as the push head 142 is in contact with the parking sprag 150.

In this state, when the vehicle moves slightly, the parking gear 170 also moves slightly. In addition, when the parking sprag 150 is in a position where the parking sprag 150 may engage with the parking gear 170 again, the compressed push spring 143 applies a restoring force to the push head 142, and accordingly, the parking sprag 150 engages with the parking gear 170.

In addition, as illustrated in FIG. 4C, when the parking portion 155 of the parking sprag 150 completely engages with the parking gear 170, the push shaft 141 may be released from a contact state with the parking sprag 150. In addition, the first outer surface 142a of the push head 142 may be spaced apart from the parking sprag 150, and the second outer surface 142b of the push head 142 may be in contact with the parking sprag 150. Accordingly, in a state in which the parking sprag 150 engages with the parking gear 170, the push head 142 may maintain a position of the parking sprag 150. Accordingly, the first driver 20 in which the parking gear 170 is mounted stops, and the parking operation is completed.

In one embodiment, the housing 10 may further include a separation prevention portion 15. As illustrated in FIGS. 4A to 4C, the separation prevention portion 15 may be formed to correspond to the push assembly 140 on one side of the housing 10. For example, the separation prevention portion 15 may protrude toward the push assembly 140 from an inner surface of the housing 10. The separation prevention portion 15 may support the push assembly 140 such that the parking sprag 150 is not separated from the parking gear 170 due to vibration or impact of a vehicle in the parking state. That is, when the parking sprag 150 engaged with the parking gear 170 partially deviates to the outside, the push head 142 comes into contact with the separation prevention portion 15, and the parking sprag 150 may not be completely separated from the parking gear 170. Accordingly, it is possible to prevent loosening of the push assembly 140 in the parking state.

Next, a parking release operation of the parking apparatus 100 for a vehicle according to an embodiment of the present disclosure will be described with reference to FIGS. 5A to 5C.

As illustrated in FIGS. 5A and 5B, when the actuator 110 and the pinion gear 120 rotate in an opposite direction to release a parking state, the rack gear 130 linearly moves in a direction away from the parking gear 170. Accordingly, an engagement state of the parking sprag 150 and the parking gear 170 is partially released.

In addition, as illustrated in FIG. 5C, when the rack gear 130 moves by a certain distance or more, the parking sprag 150 is completely separated from the parking gear 170. Accordingly, the first driver 20 operates again, and the parking state is released.

In the parking apparatus 100 for a vehicle and the transmission 1 for a vehicle according to embodiments of the present disclosure, the pinion gear 120 connected to the actuator 110, and the rack gear 130 directly pressurizes the push assembly 140. Accordingly, a configuration for performing a parking operation may be simplified to reduce an overall weight and increase productivity and maintenance efficiency.

The parking apparatus 100 for a vehicle and the transmission 1 for a vehicle according to embodiments of the present disclosure support positions of the push shaft 141 and the push head 142 in a parking state, thereby stably maintaining the parking state.

The technologies described in the embodiments are examples and do not limit the technical scopes of the embodiments. In order to concisely and clearly describe the descriptions of the present disclosure, descriptions of the known general technologies and configurations may be omitted. In addition, the connections or connection members of the lines between the components illustrated in the drawings exemplify functional connections and/or physical or circuit connections, and may be replaced in an actual device or represented by various additional functional connections, physical connections, or circuit connections. In addition, unless there are specific descriptions, such as "essential", "importantly", and so on, those may not be necessary components for the present disclosure.

The "above" or similar terms in the description and the claims of the present disclosure may refer to both the singular and the plural unless otherwise specified. In addition, when a range is described in the embodiment, the range includes the disclosure to which individual values belonging to the range are applied (when there is no description to the contrary), and the range is the same as each individual value constituting the range in the description of the disclosure. In addition, unless there is a clear description on an order of the steps constituting the method according to the embodiment or there is no description to the contrary, the steps may be performed in any suitable order. The embodiments are not limited according to the order of description of the above steps. All examples or example terminologies (for example, and so on) in the embodiments are merely for describing the embodiments in detail, and unless it is limited by the claims, the scopes of the embodiments are not limited by the examples or the example terminologies. In addition, those skilled in the art will recognize that various modifications, combinations, and changes may be made according to design conditions and factors within the scope of the appended claims or their equivalents.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A parking apparatus for a vehicle, comprising:
   an actuator;
   a pinion gear mounted on an end portion of the actuator and rotating in a same direction as the actuator rotates;
   a rack gear engaged with one side of the pinion gear and linearly moving in a tangential direction to the pinion gear as the pinion gear rotates;
   a push assembly including a push shaft extending from an end portion of the rack gear, a push head provided on one side of the push shaft and a push spring wound on the push shaft;
   a parking sprag rotating according to an operation of the push assembly; and
   a parking gear mounted on a driver and selectively engaged with the parking sprag as the parking sprag rotates,
   wherein the push assembly is coaxially arranged with the rack gear,
   wherein an one end portion of the push shaft is connected to an one end portion of the rack gear, the push head is provided on the other end portion of the push shaft, and
   wherein the push shaft linearly moves, the parking sprag contacts the push head and selectively engaged with the parking gear while moving in a longitudinal direction of the push shaft.

2. The parking apparatus for the vehicle of claim 1, wherein, when the rack gear moves toward the parking sprag, at least one of the push head and the push shaft comes into contact with the parking sprag to pressurize the parking sprag.

3. The parking apparatus for the vehicle of claim 2, wherein the push head is mounted on an outer circumferential surface of the push shaft such that one end of the push shaft is exposed, and has a truncated cone shape in which an outer surface of the push head is inclined toward the one end of the push shaft.

4. A transmission for a vehicle, comprising:
   a plurality of drivers;
   a parking apparatus connected to at least one of the plurality of drivers; and
   a housing in which the plurality of drivers and the parking apparatus are mounted,
   wherein the parking apparatus includes
   an actuator,
   a pinion gear mounted on an end portion of the actuator and rotating in a same direction as the actuator rotates,
   a rack gear engaged with one side of the pinion gear and linearly moving in a tangential direction to the pinion gear as the pinion gear rotates,
   a push assembly including a push shaft extending from an end portion of the rack gear, a push head provided on one side of the push shaft and a push spring wound on the push shaft,
   a parking sprag rotating according to an operation of the push assembly, and
   a parking gear mounted on a drive shaft and selectively engaged with the parking sprag as the parking sprag rotates,
   wherein the push assembly is coaxially arranged with the rack gear,
   wherein an one end portion of the push shaft is connected to an one end portion of the rack gear, the push head is provided on the other end portion of the push shaft, and
   wherein the push shaft linearly moves, the parking sprag contacts the push head and selectively engaged with the parking gear while moving in a longitudinal direction of the push shaft.

* * * * *